Figure 1:
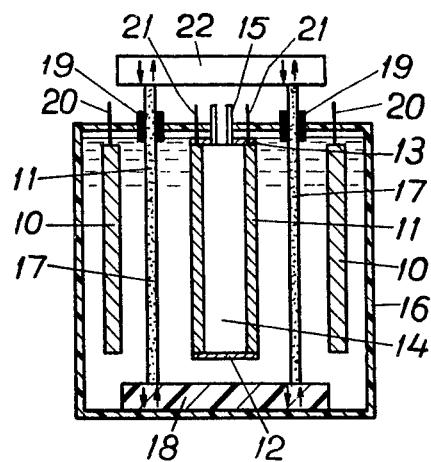

United States Patent [19]

von Krusenstierna

[11] 4,025,698
[45] * May 24, 1977

[54] ACCUMULATOR BATTERY APPARATUS AND METHOD

[75] Inventor: Otto von Krusenstierna, Taby, Sweden

[73] Assignee: Aktiebolaget Tudor, Sundbyberg, Sweden

[ * ] Notice: The portion of the term of this patent subsequent to Dec. 2, 1992, has been disclaimed.

[22] Filed: Dec. 1, 1975

[21] Appl. No.: 636,655

Related U.S. Application Data

[63] Continuation-in-part of Ser. No. 422,591, Dec. 6, 1973, Pat. No. 3,923,550, which is a continuation of Ser. No. 186,219, Oct. 4, 1971, abandoned.

[30] Foreign Application Priority Data

| Oct. 9, 1970 | Sweden | 13696/70 |
| July 16, 1975 | Sweden | 7508110 |
| July 16, 1975 | Sweden | 7508111 |

[52] U.S. Cl. .................................................. 429/4
[51] Int. Cl.² .......................................... H01M 4/28
[58] Field of Search ........................ 136/165; 429/4

[56] References Cited

UNITED STATES PATENTS 3,923,550  12/1975  Krusenstierna .................. 136/165

Primary Examiner—John H. Mack
Assistant Examiner—H. A. Feeley
Attorney, Agent, or Firm—Burns, Doane, Swecker & Mathis

[57] ABSTRACT

There is disclosed rechargeable accumulator battery apparatus in which either the zinc anode part or the porous separator part of each cell is vibrated in its own plane to produce macro and micro turbulence effects in the surrounding electrolyte to inhibit the occurrence of irregular zinc deposits on the anode in the course of repeated charge cycles. In one form, the amplitude of vibration appropriate during the charging of the particular battery is fixed mechanically by an eccentric element rotatably mounted in a permanent fashion on the battery case and adapted to be coupled to externally located motor means having a rotary power output.

16 Claims, 4 Drawing Figures

ACCUMULATOR BATTERY APPARATUS AND METHOD

This application is a continuation-in-part of copending U.S. application Ser. No. 422,591 filed on Dec. 6, 1973, now U.S. Pat. No. 3,923,550 which is a continuation of U.S. application Ser. No. 186,219 filed on Oct. 4, 1971 and now abandoned and claiming priority on the basis of application Ser. No. 13696/70 filed in Sweden on Oct. 9, 1970.

In alkaline accumulator batteries having zinc anode and silver oxide cathode or porous oxygen cathode, an ion permeable separator is usually arranged between anode and cathode in the alkaline electrolyte. An important duty of the separator is as far as possible to prevent zinc dendrites from growing over from the anode to the cathode while the accumulator is being charged. Many different types of separators have been proposed to form the protective barrier between anode and cathode, but in practice the maximum number of charging cycles obtained has only reached 100, against the desired 500 – 2000.

The reasons for dendrite formation are mostly known. The needle-like crystal growth increases if large concentration gradients for zincate ions occur during the charging process, since the needles grow towards the more concentrated part of the electrolyte away from the impoverished layer at the surface of the zinc anode. One counter-measure is a high electrolyte flow in the battery which equalizes concentration differences within the electrolyte and can in certain cases even mechanically contribute to breaking dendrite needles which have been formed. Another counter-measure is to supply electrolyte having a low zincate content to the space between the separator and the cathode so as to eliminate as far as possible the conditions which encourage dendrite growth in this space and thus towards the cathode. Another method of counteracting dendrite formation is charging with superimposed alternating current but this method has been found just as inefficient as other previously known methods in preventing the formation of dendrites.

The needle-like crystal growth may take place anywhere over the face of the zinc anode. However, there is a tendency in prior art cells of this type for the zinc deposits which occur during charging to be thicker in zones near the edges, particularly the bottom edge, of the zinc anode than in the middle portion of the face of the zinc anode. This effect is attributed to the fact that there is a greater probability of a drop in zincate ion concentration in the central portion of the narrow space between the anode and the separator than in the peripheral portions of that space, because the peripheral portions have ready access to fresh supplies of zincate ions from the electrolyte beyond the immediate confines of the narrow space directly between the anode and separator. The pronounced tendency toward thicker deposits near the bottom edge of the face of the zinc anode may be the results of gravity effects on zincate ion concentration.

In any event, the noted tendency toward unevenness becomes a significant problem where a battery is to be recharged many, many times. An unevenness initiated during one charge cycle is not removed during the subsequent discharge cycle. Instead, it remains and serves as a base for further concentration of the irregularity during later charging cycles. The result, sometimes referred to as shape-forming, is an ultimate distortion of sufficient magnitude to interfere with the proper functioning of the system.

According to the present invention the problem described above is solved and a considerable number of charging cycles can be performed in comparison with previously known methods.

The present invention relates to a method of avoiding dendrite formation when charging an alkaline accumulator battery containing cells with a zinc anode and a cathode, between which an ion-permeable separator is arranged in the alkaline electrolyte characterized in that at least one of the components anode and separator is subjected to a vibratory movement during the charging process.

The vibratory movement preferably is carried out so as to produce both macroturbulence effects and microturbulence effects in the electrolyte. The macroturbulence effects cause circulation patterns which inhibit shape-forming by minimizing zincate ion concentration gradients as between different portions of the face of the anode. The microturbulence effects function in a similar fashion to assure against the high localized zincate ion concentration gradients which are the source of objectionable needle-like crystal growth.

The present invention also relates to apparatus particularly suited to the attainment of the desired vibratory movement during the charge cycles of batteries which must be recharged many times. In order for the vibratory movement to produce the macroturbulence and microturbulence effects in the degree most beneficial in a battery of a particular design, it is desirable that the vibrations have a predetermined amplitude and that the frequency of vibration, as related to that amplitude, be sufficient to produce rather high instantaneous velocities during each vibration cycle. In an apparatus constructed in accordance with one embodiment of this invention, the battery case encloses not only the basic cell components but also means for transforming a rotary mechanical input into a vibratory movement having an amplitude appropriate for that particular battery design. A simple rotary power source of conventional nature, such as an electric motor having a regulatable speed, may be coupled to the battery input to provide the desired vibratory movement with minimal risk that the vibration will be effected in other than the intended fashion appropriate for the particular battery design.

The zinc anode may consist of a plate of metal which is relatively inert, at least to the alkaline electrolyte, having good conductivity, for example nickel or copper, having from the start, for example, electrolytically precipitated zinc on its surface. The plate may also lack the zinc coating from the start and be coated with precipitated zinc during the charging process. Instead of a plate of inert metal, a net, grid or the like of the inert metal may be used.

If the battery is a silver-zinc battery, the cathode consists of silver oxide. It may be applied on net or grid, for example, of a metal relatively inert to the alkaline electrolyte and having good conductivity, for example nickel or copper, into which the silver oxide is pressed. If the battery is a zinc-air battery the porous oxygen electrode may for instance consist of silver, activated nickel, platinum-plated carbon, manganese dioxide or a mixture of silver oxide and nickel. The invention can also be used with other cathodes together with zinc anodes in alkaline batteries, such as for instance cathodes of nickel oxide of the type normally used in the Jungner battery (nickel-cadmium battery) and in the Edison battery (nickel-iron battery) and cathodes of copper oxide of the type normally used in Lalande batteries (zinc-copper oxide battery).

The separator is a porous sheet or net, the holes of which render the unit ion-permeable. The ion permeable separator may consist of a separating wall made of a non-conducting metal, for example a plastic such as cellophane, polyvinyl chloride, polythene, polyvinyl alcohol or polyamide or of an inorganic material such as oxides which are insoluble in the alkaline electrolyte, for example zirconium or titanium dioxide.

The electrolyte preferably consists of potassium hydroxide dissolved in water to a solution containing 20–45 percent by weight of the hydroxide.

In some of its aspects, the invention is applicable also to batteries other than alkaline batteries. For example, vibration in accordance with the invention of the zinc anode of a battery having a conventional acid electrolyte and a lead oxide cathode can be beneficial. In such a battery, the separator if used must of course be inert to the acid electrolyte.

The vibratory movement is suitably carried out with a frequency of 0.01– 1000 Hz, preferably 1–500 Hz, and an amplitude of 0.1 – 10 mm. For most batteries suitable for use in supplying motive power for vehicles or the like, it will be found that amplitudes at least as great as about 1 mm., and more preferably at least as great as 1.5 – 2 mm., are desirable in producing the desired macroturbulence effects which serve to eliminate shape-forming. Whatever amplitude is chosen for a particular battery design will serve as a guide also for establishing a proper frequency, because the maximum linear velocity of the vibrated part should ordinarily exceed about 100 millimeters per second, and more preferably should exceed about 300 millimeters per second, in order to produce the type of microturbulence in the electrolyte along the surface of the zinc anode which serves to eliminate substantially needle-like dendritic growths during charging operations of alkaline batteries. Higher frequencies also are effective, but the degree of improvement in zinc deposit compactness and homogeneity which can be expected to result from an increase in frequency from one high value (e.g., 100 Hz) to a still higher value (e.g., 200 Hz) will not ordinarily be very great.

Figure 2:
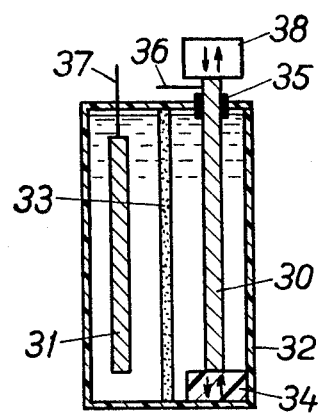
Figure 3:
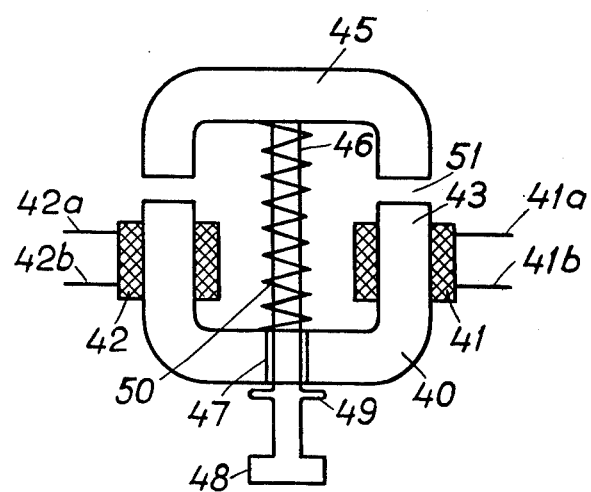

The invention will be further explained by describing embodiments with reference to the accompanying drawings in which FIG. 1 shows schematically in cross section a device according to the invention in which the separator is subjected to a vibratory movement;

FIG. 2 shows schematically in cross section a device according to the invention in which the anode is subjected to a vibratory movement;

FIG. 3 a vibrating device according to one embodiment; and

Figure 4:
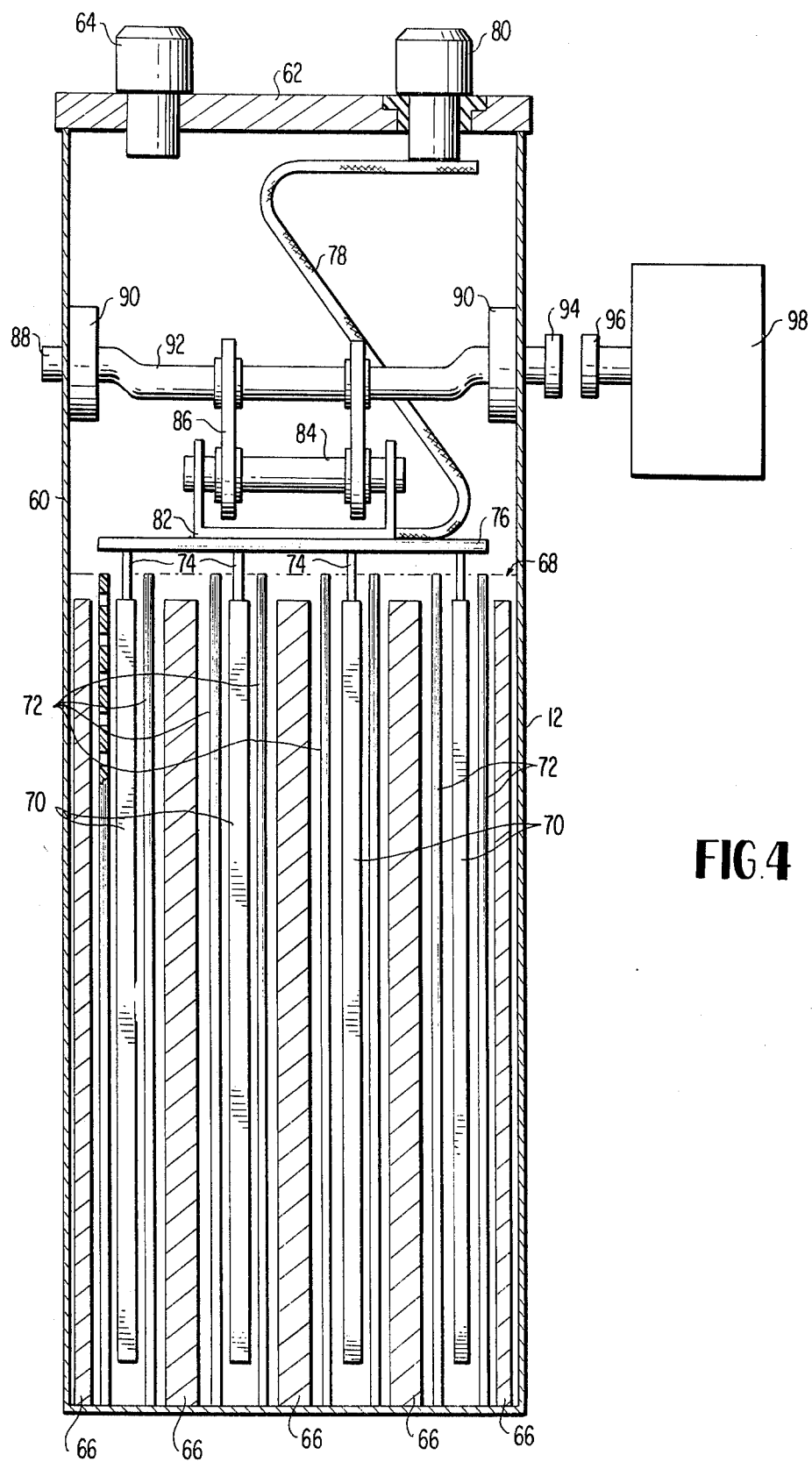

FIG. 4 is a schematic illustration in cross section of another embodiment in which the battery case encloses not only the cell components but also mechanical means for establishing the desired amplitude for the vibratory movement which is to take place during charging operations.

In the drawings the accumulator batteries are shown with only a limited number of cells in order to make it easier to understand the invention. However, in practice the battery comprises a considerable number of cells.

FIG. 1 shows a zinc-air battery. This has two zinc anodes 10 consisting of nickel plates coated with zinc. The two porous oxgyen cathodes 11 are constructed of a mixture of silver oxide particles and nickel particles which are compressed and sintered together. All the electrodes are in the form of flat plates parallel to each other. The oxygen cathodes, together with a bottom 12, a lid 13 and two end pieces, not shown, form a gas chamber 14 to which air or oxygen gas can be led through the supply pipe 15. The bottom, lid and the end pieces, not shown, may consist of a plastic such as polypropene, chlorinated polyether or fluorine plastic, and may be fixed to the cathodes by heating and pressing or by glueing, for example.

The electrolyte vessel 16, which may consist of one of the plastics mentioned above, contains a water solution of potassium hydroxide as electrolyte. Between the anodes and cathodes and parallel to these are two porous separators or partition walls 17. These may consist of wafers of, for example, cellophane, polyvinylchloride or polythene, about 0.1 mm in thickness. They extend right through the electrolyte vessel without being fixed to its walls and divide the electrolyte vessel into three spaces. The separators are attached to an elastic bottom support 18, for example of neoprene rubber, and are supported in the lid of the electrolyte vessel by elastomer sealing ribs 19, for example of neoprene rubber. Connection terminals for anodes and cathodes are designated 20 and 21, respectively. They are of course insulated from the electrolysis vessel (if this is not made of insulating material).

During the charging process the separators 17 are subjected to a vibratory movement with the schematically shown device 22. This may comprise an electromagnetic vibrator for example of the type shown in FIG. 3, driven by 50 periodic alternating current. The vibrations are effected with a frequency of 50 Hz and an amplitude of 1 mm. The vibrations may also be effected by a device provided with a time relay which, by adjustment of the time relay, produces an upward and downward movement of the separators.

In the device according to FIG. 2, which shows a silver-zinc battery, the zinc anode 30 consists of a net of nickel in which zinc is embedded. The cathode 31 comprises a net of nickel in which silver oxide is pressed in. The electrolyte vessel 32 is of the same material as that indicated for the electrolyte vessel in the device according to FIG. 1. The electrolyte is also the same. The porous separator 33 between the parallel with anodes and cathodes, extends right through the whole electrolyte vessels and divides it into two spaces. In this case also it may consist of a wafer of cellophane or some other material previously exemplified, about 0.1 mm in thickness. The anode 30 rests against an elastic bottom support 34 and is supported in the lid of the electrolyte vessel by an elastic washer 35. The material in the parts 34 and 35 may be of the same type as in parts 18 and 19 in the device according to FIG. 1. The connection terminals for anode and cathode are designated 36 and 37, respectively. They are of course insulated from the electrolysis vessel (if this is not made of insulating material).

During the charging process the zinc anode is subjected to a vibratory movement by means of the device 38, shown schematically, which is of the same design as the device 22 in FIG. 1.

An example of a suitable vibratory means, that is to say the device 22 in FIG. 1 and the device 38 in FIG. 2 is shown in FIG. 3. It consists of an iron core in the shape of a horse-shoe, having magnetic coils 41 and 42, respectively on each leg 43 and 44. The coils 41 and 42, which are connected in parallel or in series, are provided with connections 41a, 41b, and 42a, and 42b, resepctively. A yoke 45 of soft iron is attached to a shaft 46 which is arranged to move in a central through-hole 47 in the iron core and which is provided at the bottom with a foot 48 and above this with a stop 49. Together with the stop 49, a spring 50 maintains a pole gap distance 51 between the yoke and the end surfaces of the legs of the iron core. When alternating current is connected to the coils, the yoke with axis and foot describes a forward and backward movement in relation to the end surfaces of the legs because the yoke is attracted towards the iron core when the current flows through the coil and is returned by the spring to its original position at current zero. The vibratory means is arranged to rest with the foot 48 against the separators 17 and the anode 30 in the devices according to FIGS. 1 and 2, respectively.

The embodiment shown schematically in FIG. 4, includes a case or housing means 60 having a top closure 62 sealed thereto to provide an enclosure for the internally located parts. The case 60 and the closure 62 are constructed of materials which provide not only the desired structural integrity for the battery as a whole but also an electrically conductive path from one of the battery terminals 64 to the cathode components 66 of the cells of the battery.

The electrolyte level is indicated generally at 68. It covers the cathode components as well as dissoluble zinc anode components 70 spaced from the cathode components 66 and isolated electrically from the casing 60. Spacers or separators 72 having pores or holes through which zincate ions dissolved in the electrolyte may pass are fixed relative to the casing 60 in the spaces between the cathodes 66 and the anodes 70.

The cathodes 66, the ion-permeable separators 72, and the electrolyte may be of the materials referred to above in connection with the descriptions of other embodiments.

The zinc anode components 70 are constrained by side edge guides so that they may move only in an up and down direction. They have extensions 74 protruding upwardly to a common bridge or collector part 76 which is electrically conductive and which is sufficiently strong and rigid to transmit vibratory motion to the anode parts 70 connected thereto. The electrical path from the several zinc anodes 70 extends through the commmon bridge 76 and a flexible cable 78 to the second battery terminal 80.

Bracket means 82, preferably of rigid, electrically insulating, and chemically inert (to the electrolyte) material is fixed to the upper side of the bridge 76 and carries a cross bar or shaft 84. Connecting rod or link means 86 are pivotally connected at their lower end portions to the cross bar 84 and extend upwardly to a drive shaft 88. The drive shaft 88 is supported for rotation in bearing means 90 carried by the casing 60, and it includes an offset or eccentric portion 92 connected to the connecting rods 86 for rotation relative thereto.

A coupler component 94 is fixed to one end of the drive shaft 88 exteriorly of the casing 60 for cooperation with a mating coupler component 96 carried by the output shaft of a power means such as an electric motor 98. When the battery is to be charged, it is brought to a location such that the coupler components 94 and 96 may be engaged to permit the drive shaft 88 to be rotated by the power means 98.

This arrangement makes it feasible for a single power means 98 located at a battery charging station to serve a large number of batteries of perhaps different design. The amount of offset of the eccentric portion 92 of the drive shaft 88, which forms a permanent part of each battery, fixed for that particular battery a vibration amplitude appropriate for achieving the needed macro and micro turbulence effects in the electrolyte when the shaft is rotated at a reasonably high rate such as, for example, at least about 10 and preferably at least about 20–25 revolutions per second. Since higher rotational speeds have no detrimental effect on the zinc deposits during battery charging operations, the power means 98 may have a single speed and still be suitable for use with a whole family of specifically different battery designs. If desired, however, the power means 98 may be one which is adjustable as to speed, and the battery case 60 or cover 62 may carry a permanent legend indicating the preferred speed setting for that particular battery.

Although FIG. 4 illustrates the zinc anodes as being connected to the eccentric portion 92 of the drive shaft, it will be evident that a similar system may be employed to vibrate the separators 72 in instances where it is desired to hold the anodes stationary and provide the desired relative movments through vibration of the separators.

The method according to the present invention, of eliminating internal short-circuiting between electrodes during the charging process can be used not only for silver-zinc batteries and zinc-air batteries, but also for other alkaline batteries having zinc anodes such as nickel-zinc batteries, copper oxide-zinc batteries and manganese dioxide-zinc batteries. For example a nickel-zinc battery making use of the invention may be constructed in accordance with FIGS. 2 or 4 using a cathode consisting of a net of nickel in which nickel oxide is impressed.

What is claimed is:

1. Method of reducing dendrite formation when repeatedly charging an accumulator battery containing a cell with a zinc anode part and a cathode, and an ion-permeable separator part arranged in a fluid electrolyte between the anode part and the cathode, with each of said anode and separator parts having a large generally planar surface defining the plane of said part and a comparatively small thickness in a direction perpendicular to said plane, which comprises vibrating one of the parts in the cell in the direction of the plane of the parts during the charging process with a frequency and an amplitude sufficient to provide macro and micro turbulence effects in the electrolyte thereby inhibiting dendrite formations and shape-forming deposits of zinc on said anode part.

2. The method of claim 1 wherein the vibrated part is the separator part.

3. The method of claim 1 wherein the vibrated part is the zinc anode part.

4. The method of claim 1 wherein all portions of the vibrating part are mounted to move uniformly along the direction of the length of the part and perpendicular to the surface of the electrolyte.

5. The method of claim 1 wherein the vibrating part is vibrated at an amplitude of at least about 1 mm and a frequency sufficient to provide the vibrated part with a maximum velocity of at least 100 millimeters per second at some momemt during each cycle of vibratory movement.

6. The method of reducing dendrite formation when repeatedly charging an accumulator battery containing a cell with a zinc anode having a generally planar surface defining the plane of the anode and a comparatively small thickness in a direction perpendicular to said plane immersed in a liquid electrolyte which comprises vibrating the anode during the charging process in the direction of the plane of the anode with a frequency and an amplitude sufficient to provide macro and micro turbulence effects in the electrolyte thereby inhibiting dendrite formation on said zinc anode.

7. The method of claim 6 wherein the anode is vibrated at an amplitude of at least about 1 mm. and a frequency sufficient to provide the vibrated part with a maximum velocity of at least about 100 millimeters per second at some moment during each cycle of vibratory movement 8. The method of claim 7 wherein the anode is vibrated at an amplitude of at least about 1.5 – 2 mm. and a frequency sufficient to provide the vibrated part with a maximum velocity of at least about 300 millimeters per second at some moment during each cycle of vibratory movement.

9. Rechargeable battery apparatus containing at least one cell with a zinc anode part comprising a plate having a length and width defining the plane of the plate and a thickness much smaller than either the length or the width, a cathode plate and an ion-permeable separator part comprising a plate having a length and width defining the plane of the plate and a thickness much smaller than either the length or the width, arranged in a liquid electrolyte and interleaved between the anode part plate and the cathode plate, and means for reducing dendrite formation on the zinc anode part during the charging process including a vibratory means operatively connected with at least one of the parts to subject said part to a vibratory movement during a charging process in the direction of the plane of said part at a frequency and an amplitude sufficient to provide macro and micro turbulence effects in the electrolyte thereby inhibiting dendrite formations and shape-forming of the zinc deposits on said anode, said vibrating part being mounted so that all portions thereof move substantially the same distance during each cycle of vibration.

10. The apparatus of claim 9 wherein the vibratory means is operatively connected to the separator part and said zinc anode part is stationary.

11. The apparatus of claim 9 wherein the vibratory means is operatively connected to the zinc anode part and said separator part is stationary.

12. The apparatus of claim 9 wherein said vibratory means includes means for moving all portions of the vibrating part in a reciprocating manner to have at the same moment the same rectilinear movement during all portions of the vibration cycle.

13. The apparatus of claim 9 which includes a plurality of said cells and wherein a casing encloses said anode part, said separator part, said cathode part, and said electrolyte, and wherein said vibratory means includes means permanently mounted within said casing for fixing the amplitude of said vibratory movement at a value appropriate for the particular arrangement of cell components.

14. The apparatus of claim 13 wherein the last mentioned means includes an eccentric portion of a rotary element sufficient to provide a vibratory amplitude of at least about 1 mm and wherein an end portion of said rotary element is exposed on the exterior of said casing and wherein means are provided for coupling said end portion of said rotary element to a power supply for rotating it at a speed of at least about 20–25 revolutions per second.

15. A rechargeable battery containing a cell having a liquid electrolyte with a zone anode having a length and width defining the plane of the anode and a thickness much smaller than either the length or the width, a cathode plate, and means for reducing dendrite formation on the zinc anode part during the charging process including a vibratory means operatively connected with the zinc anode to subject all parts of the zinc anode to substantially equal vibratory movement relative to the electrolyte during the charging process, said movement being in the direction of the plane of the anode with a frequency and an amplitude sufficient to inhibit dendrite formation on said zinc anode.

16. The battery of claim 15 wherein said vibratory means include means for moving all portions of the zinc anode in a reciprocating manner to have at the same moment the same movement, said movement being in a direction perpendicular to the surface of the electrolyte.

* * * * *